(12) United States Patent
Arnone et al.

(10) Patent No.: US 7,508,602 B2
(45) Date of Patent: Mar. 24, 2009

(54) OPTICAL ASSEMBLY WITH REMOVABLE SECTION

(75) Inventors: David F. Arnone, Mountain View, CA (US); Ken Wallace, San Jose, CA (US); Carl Iacono, Livermore, CA (US)

(73) Assignee: Bookham Technology plc, Northamptonshire (GB)

( * ) Notice: Subject to any disclaimer, the term of this patent is extended or adjusted under 35 U.S.C. 154(b) by 136 days.

(21) Appl. No.: 11/585,548

(22) Filed: Oct. 24, 2006

(65) Prior Publication Data

US 2007/0103802 A1 May 10, 2007

Related U.S. Application Data

(60) Provisional application No. 60/733,704, filed on Nov. 4, 2005.

(51) Int. Cl.
*G02B 7/02* (2006.01)

(52) U.S. Cl. .................. 359/811; 359/815; 359/819

(58) Field of Classification Search .......... 359/811, 359/815, 819, 827

See application file for complete search history.

(56) References Cited

U.S. PATENT DOCUMENTS

| | | | |
|---|---|---|---|
| 3,683,297 A | 8/1972 | Hobart et al. | |
| 3,684,381 A * | 8/1972 | Zoot | 356/138 |
| 4,707,585 A | 11/1987 | Monteith et al. | |
| 5,394,049 A | 2/1995 | Luecke | |
| 5,638,223 A * | 6/1997 | Ikeda | 359/827 |
| 7,126,768 B2 * | 10/2006 | Yokota et al. | 359/811 |
| 2003/0076602 A1 * | 4/2003 | Nishikawa | 359/819 |

FOREIGN PATENT DOCUMENTS

WO PCT/US2006/041249 1/2007

OTHER PUBLICATIONS

Preliminary Report on Patentability with Written Opinion for PCT/US2006/041249 (related to the present application), publication date May 15, 2008, Bookham Technology plc.

* cited by examiner

*Primary Examiner*—Timothy J Thompson
(74) *Attorney, Agent, or Firm*—Roeder & Broder LLP (57) ABSTRACT

An optical assembly (16) for a precision apparatus (10) includes an optical element (234) and a housing (230) that defines a housing cavity (244). The housing (230) includes a body section (238), a removable section (240) and a fastener assembly (242). The body section (238) is secured to an apparatus frame (12) of the precision apparatus (10). The removable section (240) retains the optical element (234) with the optical element (234) positioned in the housing cavity (244). The fastener assembly (242) selective secures the removable section (240) to the body section (238). With this design, the removable section (240) can be selectively removed to repair or replace the optical element (234) and the optical element (234) is supported by a rigid mechanical housing (230) so that the optical element (234) is less susceptible to long term or operating misalignments.

24 Claims, 9 Drawing Sheets

OPTICAL ASSEMBLY WITH REMOVABLE SECTION

RELATED APPLICATION

This application claims priority on Provisional Application Ser. No. 60/733,704 filed on Nov. 4, 2005 and entitled "OPTICAL ASSEMBLY WITH REMOVABLE SECTION". As far as is permitted, the contents of Provisional Application Ser. No. 60/733,704 are incorporated herein by reference.

BACKGROUND

Optical mirrors are commonly used in precision apparatuses to make precise adjustments to the path of a beam. For example, the precision apparatus can include a beam source that generates a beam, an object, and an optical mirror that redirects the beam at the object. In certain situations, the performance of the precision apparatus is enhanced if the beam travels in a controlled environment. With this design, one or more tubes extend between the beam source and the object and the mirror is positioned within and secured to one of tubes. Unfortunately, with this design, repairing or replacing the mirror is relatively difficult and requires serious disassembly of the precision apparatus. Further, the mirror is difficult to adjust and is susceptible to long term or operating misalignments.

SUMMARY

The present invention is directed to an optical assembly for a precision apparatus that includes an apparatus frame. In one embodiment, the optical section, a removable section and a fastener assembly. The body section is secured to the apparatus frame. The removable section retains the optical element with the optical element positioned within the housing. The fastener assembly selective secures the removable section to the body section. With this design, in certain embodiments, the removable section can be selectively removed to repair or replace the optical element and the optical element is supported by a rigid mechanical housing so that the optical element is less susceptible to long term or operating misalignments.

In one embodiment, the housing includes a housing seal assembly that seals the removable section to the body section. With this design, the optical assembly provides a sealed optical element mount.

Additionally, in one embodiment, the optical element can be coupled to the removable section in a kinematic fashion. Further, an element plate can be used to retain the optical element. With this design, the optical element can be retained in a fashion that inhibits distortion of the optical element.

In another embodiment, the optical assembly includes an element adjuster that adjusts the position of the optical element relative to the removable section and the rest of the precision apparatus. For example, the element adjuster can include one or more electronic movers that move the optical element.

Moreover, the present invention is also directed to a precision apparatus that includes a beam source that generates a beam, an object, and an optical assembly. Additionally, the present invention is also directed to a method for redirecting a beam on a beam path.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
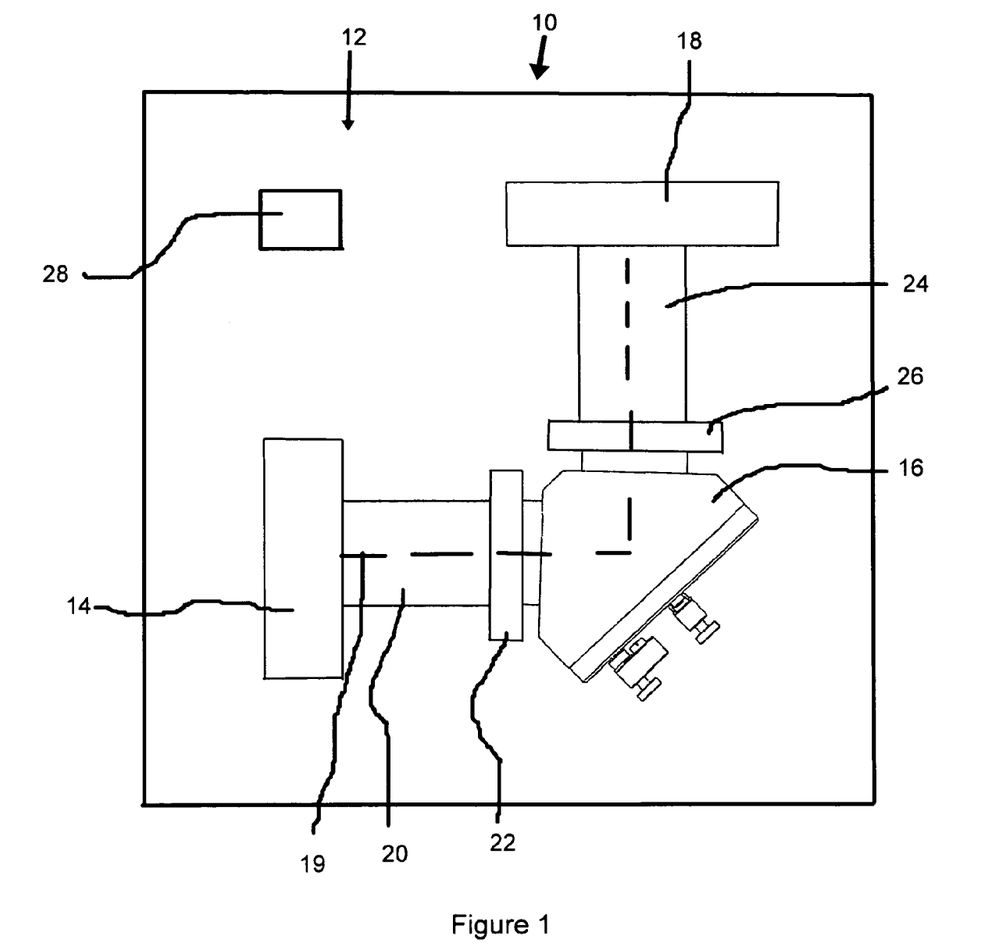
FIG. 1 is a simplified schematic illustration of a precision apparatus having features of the present invention.

Referring to FIG. 1, the present invention is directed to a precision apparatus 10 that, for example, can be used in manufacturing, technical or scientific instruments. As an example, the precision apparatus 10 can be a measurement system, e.g. a laser interferometer, encoder, and/or other measuring device. The design and orientation of the components of the precision apparatus 10 can be changed to suit the requirements of the precision apparatus 10. FIG. 1 is a simplified top view of one embodiment of the precision apparatus 10. In this embodiment, the precision apparatus 10 includes an apparatus frame 12, a beam source 14, an optical assembly 16 and an object 18. However, one or more of these components can be optional.

The apparatus frame 12 retains and/or supports the other components of the precision apparatus 10. In one embodiment, the apparatus frame 12 is generally rectangular plate shaped and is made of a rigid material.

The beam source 14 generates a beam 19 (illustrated in phantom) of light energy that is directed at the optical assembly 16. In one embodiment, the beam source 14 is a laser source and the beam 19 is a small diameter optical beam.

The optical assembly 16 is positioned in the path of the beam 19. In one embodiment, the optical assembly 16 redirects the beam 19 at the object 18. Alternatively, for example, the optical assembly 16 can be used to otherwise alter the beam.

As non-exclusive examples, the object 18 can be a mirror, lens, telescope, filter, emitter, sensor, and/or detector.

In one embodiment, as illustrated in FIG. 1, the apparatus 10 also includes (i) a first tube 20 that extends between the beam source 14 and the optical assembly 16, the first tube 20 including a first mounting region 22 that fits over and selectively secures the first tube 20 to the optical assembly 16, (ii) a first seal (not shown), e.g. an "O" ring type seal, that seals the first tube 20 to the optical assembly 16, (iii) a second tube 24 that extends between the object 18 and the optical assembly 16, the second tube 24 including a second mounting region 26 that fits over and selectively secures the second tube 24 to the optical assembly 16, and (iv) a second seal (not shown), e.g. an "O" ring type seal, that seals the second tube 24 to the optical assembly 16. With this design, the beam 19 can travel from the beam source 14 to the object 18 in a sealed, controlled environment. In non-exclusive, alternative environments, the controlled environment can be a vacuum, an inert gas, or another type of fluid.

As an overview, in certain embodiments, the optical assembly 16 is uniquely designed so that the optical assembly 16 can be repaired and adjusted relatively easily. Further, the optical assembly 16 is less susceptible to long term or operating misalignments.

Additionally, the precision apparatus 10 can include an environmental controller 28 that provides the controlled environment for the beam 19 to travel. For example, the environmental controller 28 can include a reservoir that contains an inert gas, and/or one or more pumps.

Figure 2A:
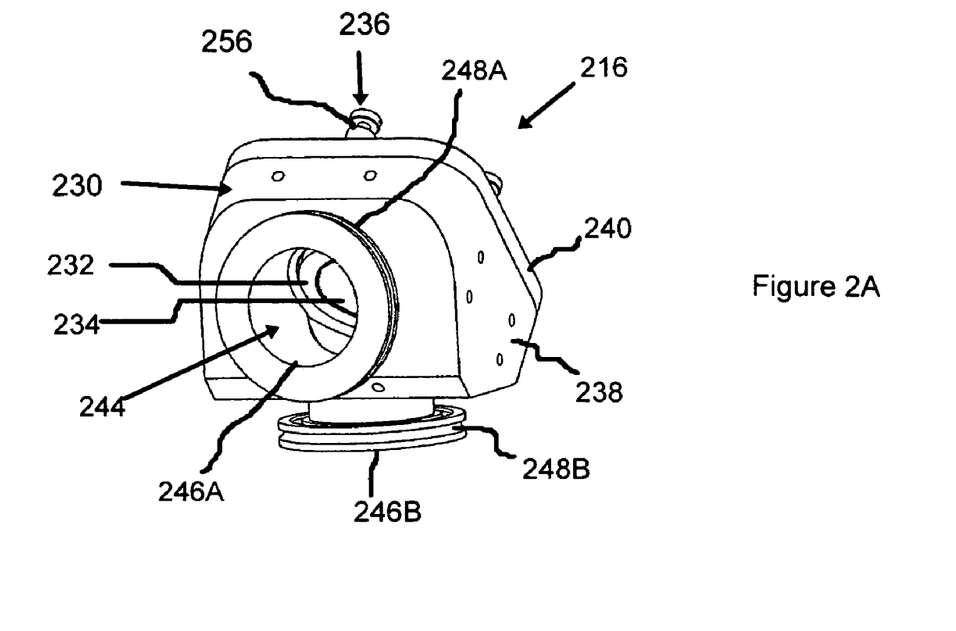
FIGS. 2A and 2B are alternative perspective views of a first embodiment of an optical assembly having features of the present invention.
Figure 2B:
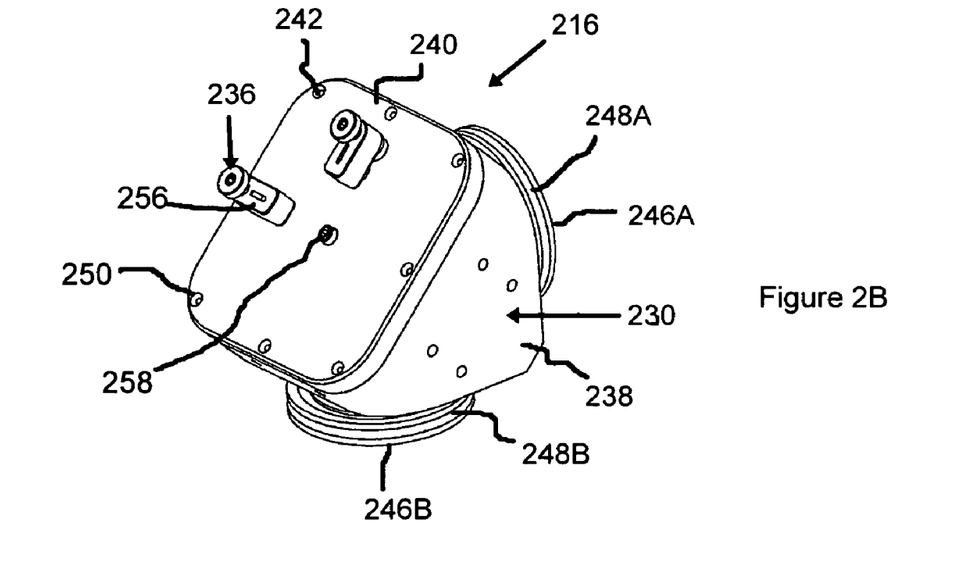
Figure 2C:
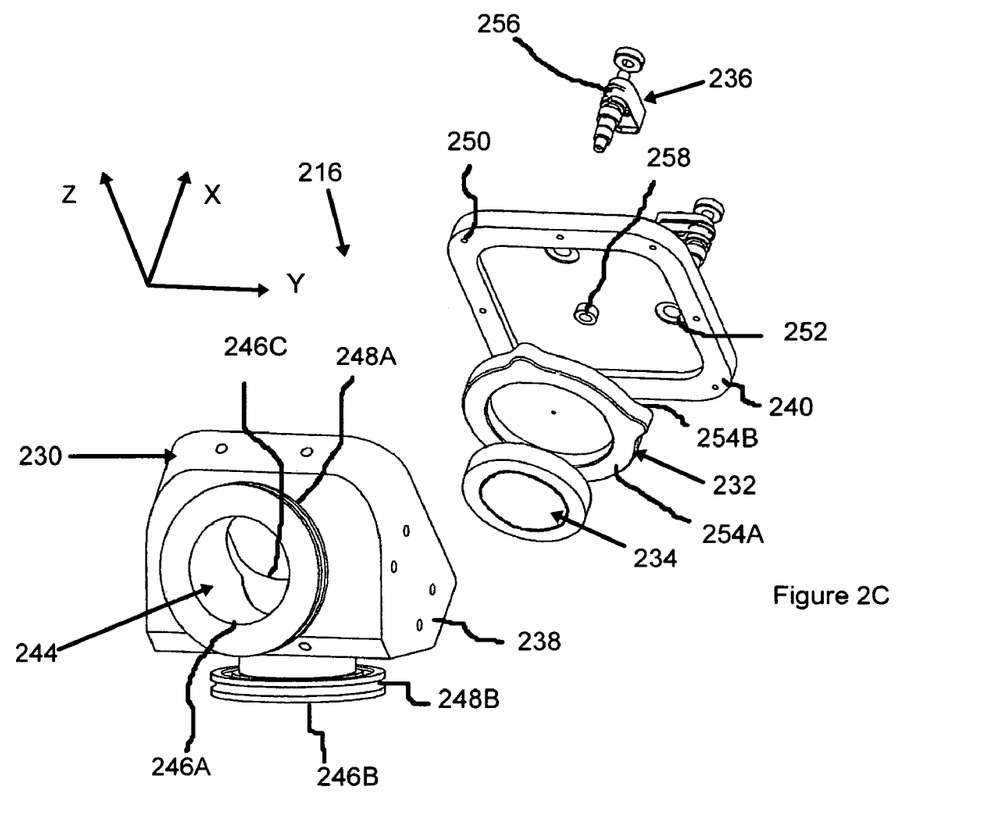
FIG. 2C is an exploded perspective view of the optical assembly of FIGS. 2A and 2B.

FIGS. 2A and 2B are alternative perspective views and FIG. 2C is an exploded perspective view of a first embodiment of an optical assembly 216 having features of the present invention that can be used in the apparatus 10 of FIG. 1 or another type of apparatus 10. In this embodiment, the optical assembly 216 includes a housing 230, an element plate 232, an optical element 234, and an element adjuster 236. The design of each of these components can be varied to achieve the design requirements for the optical assembly 216. It should be noted that the optical assembly 216 can be designed without one or more of the components described above. For example, in certain embodiments, the optical assembly 216 could be designed without the element plate 232 or the element adjuster 236.

FIG. 2C includes an orientation system that illustrates an X axis, a Y axis that is orthogonal to the X axis, and a Z axis that is orthogonal to the X and Y axes. It should be noted that these axes can also be referred to as the first, second, and third axes. In general, there are six degrees of freedom, including translation along the X, Y and Z axes and rotation about the X, Y and Z axes.

The housing 230 retains and maintains the position of the other components of the optical assembly 216. In one embodiment, the housing 230 is secured to the apparatus frame 12 (illustrated in FIG. 1) and the housing 230 couples the other components of the optical assembly 216 to the apparatus frame 12. In one embodiment, the housing 230 includes a body section 238 that is secured to the apparatus frame 12, a removable section 240 that is selectively secured to the body section 238, and a fastener assembly 242 that selectively secures the removable section 240 to the body section 238. The size, shape and design of each of these components can be varied to achieve the design requirements of the optical assembly 216.

In FIG. 2A-2C, the body section 238 is defines a housing cavity 244 that receives the optical element 234 and the element plate 232, and includes (i) a first mounting flange 246A that defines a first body opening, (ii) a second mounting flange 246B that defines a second body opening, and (iii) a rear body opening 246C. In this embodiment, the body section 238 is shaped somewhat similarly to a pipe elbow with the first mounting flange 246A and the second mounting flange 246B at approximately 90 degrees relative to each other and the rear body opening 246C positioned at the rear of the body section 238. Alternatively, the mounting flanges 246A, 246B and the rear body opening 246C can be located in other positions.

In one embodiment, the first body opening and the second body opening are each a circular type opening and the rear body opening 246C is generally rectangular shaped opening. Further, in certain embodiments, the rear body opening 246C is large enough so that the optical element 234 and the element plate 232 can pass easily through the rear body opening 246C into the housing cavity 244. Alternatively, the body openings can have other shapes or sizes.

In one embodiment, the beam 19 (illustrated in FIG. 1) from the beam source 14 (illustrated in FIG. 1) passes through the first body opening to the optical element 234. Subsequently, the beam 19 passes through the second body opening to the object 18 (illustrated in FIG. 1). In FIG. 1, the first mounting flange 246A defines a first seal retainer 248A that is positioned near and encircles the first body opening, and the second mounting flange 246B defines a second seal retainer 248B that is positioned near and encircles the second body opening. For example, each seal retainer 248A, 248B can define and annular groove that receives an "O" ring (not shown) for sealing the body section 238 to the tubes 20, 24 (illustrated in FIG. 1).

The removable section 240 is removable secured to the body section 238 and the removable section 240 secures the optical element 234, the element plate 232, and the element adjuster 236 to the body section 238. Further, the removable section 240 is sized and shaped to cover the rear body opening 246C. In one embodiment, the removable section 240 corresponds to the shape of the rear body opening 246C and is generally rectangular plate shaped. Alternatively, the removable section 240 can have another shape. For example, the removable section 240 can include (i) a plurality of spaced apart fastener apertures 250 that are positioned along the perimeter of the removable section 240, and (ii) a plurality of spaced apart mover apertures 252.

With this design, in certain embodiments, the removable section 240 can be selectively removed to repair or replace the optical element 234 without removing the rest of the housing 240 from the tubes 20, 24 (illustrated in FIG. 1) and the rest of the apparatus 10 (illustrated in FIG. 1). Further, the optical element 234 is supported by a rigid mechanical housing 230 so that the optical element 234 is less susceptible to long term or operating misalignments.

The body section 238 and the removable section 240 can be made of a rigid material. Non-exclusive examples of suitable materials include steel, plastic, aluminum, or invar.

The fastener assembly 242 selectively secures the removable section 240 to the body section 238. In one embodiment, the fastener assembly 242 includes a plurality of bolts that fit through the fastener apertures 250 and thread into the body section 238 to secure the removable section 240 to the body section 238. Alternatively, for example, the fastener assembly 242 can include an adhesive, or another type of clamp.

The element plate 232 retains the optical element 234 and provides a rigid frame for securing the optical element 234 to the removable section 240. In certain embodiments, the element plate 232 supports the optical element 234 so that the element adjuster 236 can move the optical element 234 without distorting or damaging the optical element 232. Further, the element plate 232 can retain the optical element 234 in a fashion that allows for the easy removal of the optical element 234 from the element plate 232. For example, the optical element 234 can be secured to the element plate 232 with an adhesive. In one embodiment, the element plate 232 is generally disk shaped and includes a front side 254A that faces the optical element 234 and an opposed rear side 254B that is opposite the optical element 234.

The optical element 234 influences the beam 19 that is directed to the object 18. In one embodiment, the optical element 22 is a generally disk shaped reflective element, e.g.

a mirror. Alternatively, for example, the optical element 22 can be an optical filter, a polarizer, a prism, a filter wheel, a light source, a beam steerer, or another type of optical component or source.

The element adjuster 236 precisely adjusts the position of the optical element 234 relative to the housing 230 and the rest of the apparatus 10. With this design, the position of the optical element 234 can be adjusted until the beam 19 is precisely directed to the object 18. For example, the element adjuster 236 can be used to adjust the position of the optical element 234 and the element plate 232 relative to the housing 230 with one to six degrees of motion. The design of the element adjuster 236 can vary. For example, the element adjuster 236 can include one or more manually and/or electrically driven movers or actuators. In FIGS. 2A-2C, the element adjuster 236 includes two spaced apart electronic movers 256 that electronically move the optical element 234 and the element plate 232 and one manual mover 258. With this design, the element adjuster 236 can move the optical element 234 and the element plate 232 with three degrees of movement, namely translation along the X axis and rotation about the Y and Z axes. Alternatively, any combination of manual and/or motorized movers 256, 258 can be used. For example, the manual mover 258 can be replace with an electronic mover, the electronic movers 256 can be replaced with manual movers, or one or more of the movers 256, 258 can be eliminated.

The design and operation of each mover 256, 258 can be altered depending upon the requirements of the precision apparatus 10. In FIGS. 2A-2C, each electronic mover 256 is a piezoelectric driven actuator that is secured to the removable section 240 and that extends through an aperture in the removable section 240. One example of an actuator which may be used are those sold under the trade name "New Focus Picomotor" available from New Focus, Inc., San Jose, Calif. Other actuators include magnetostrictive actuators such as those available from Energen and piezoactuators. One embodiment of an actuator is described in U.S. Pat. No. 5,410,206, issued to Luecke et al. and assigned to New Focus, Inc., the contents of which are incorporated herein by reference.

In one embodiment, the manual mover 258 includes a threaded set screw that is threaded into an aperture in the removable section 240. Alternatively, the movers 256, 258 can have another design. For example, each electronic mover 256 can be another type of electronic actuator, such as a linear motor, a rotary motor, or a voice coil motor.

In one embodiment, the element adjuster 236 is coupled to the element plate 232 and the optical element 234 in a kinematic fashion. This inhibits the element adjuster 236 from deforming the element plate 232 and the optical element 234. For example, a distal end of each mover 256, 258 can be coupled to the rear side 254B of the element plate 232 with a kinematic gimbal arrangement of the kinematic seats. In this embodiment, the manual mover 258 can be positioned directly behind the optic center of the optical element 234.

Alternatively, for example, a distal end of each mover 256, 258 can include a ball tip and the rear side 254B of the element plate 232 can include (i) a cone that is engaged by the ball tip of one of the movers 256, 258, (ii) a vee that is engaged by the ball tip of one of the movers 256, 258, and (i) a flat area that is engaged by the ball tip of one of the movers 256, 258. In this embodiment, a plurality of resilient members (not shown) can be used to urge the element plate 232 towards the removable section 240 and against the ball tip of the movers 256, 258 of the element adjuster 236.

It should be noted that other kinematic arrangements can be utilized. For example, the rear side 254B of the element plate 232 can include three vees. Still alternatively, the element adjuster 236 can be coupled to the element plate 232 in a non-kinematic fashion, such as with flexural and rolling element bearings.

Further, in one embodiment, the coupling between the element adjuster 236 and the element plate 232 provides a relatively low friction and highly consistent connection between the element adjuster 236 and the element plate 232 that allows for precise and easily repeatable positioning of optical element 234.

Additionally, the apparatus 10 can include one or more sensors (not shown) that measure or monitor the position of the optical element 234, the element plate 232, and or the beam 19 that is reflected off of the optical element 234.

Figure 3A:
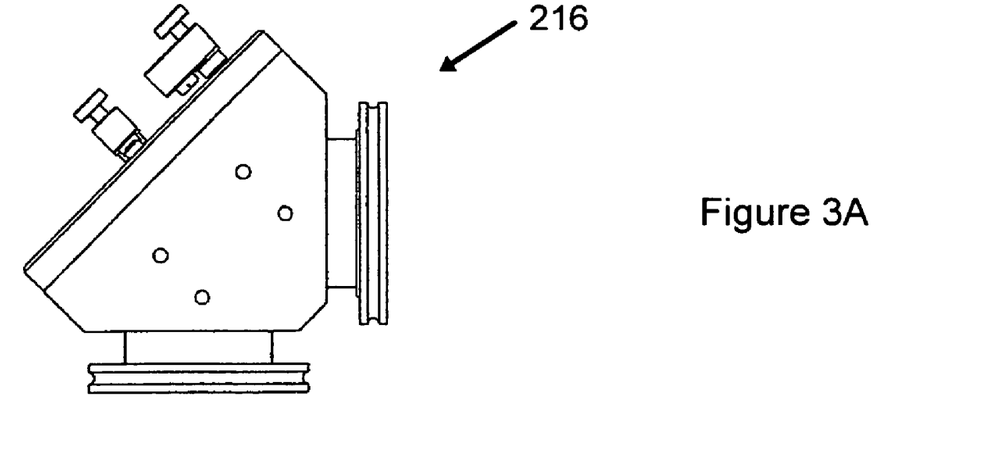
FIGS. 3A-3C are alternative plan views of the optical assembly of FIGS. 2A and 2B.
Figure 3B:
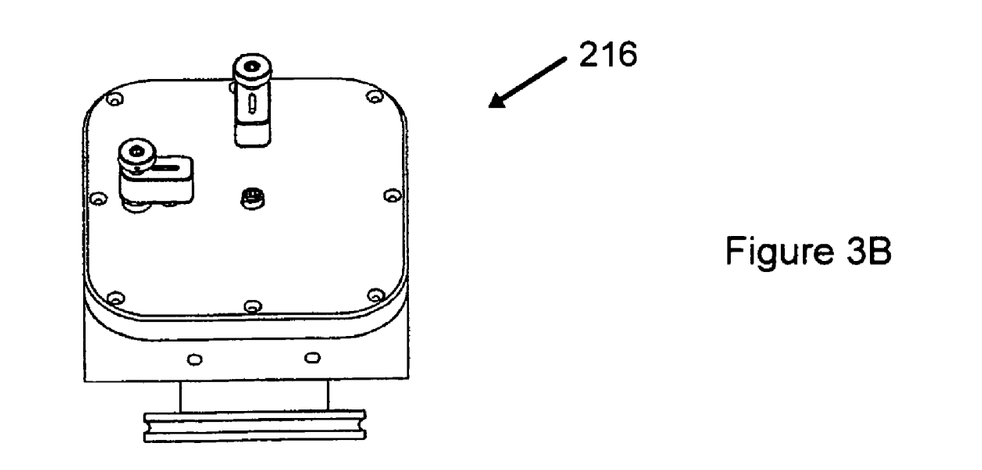
Figure 3C:
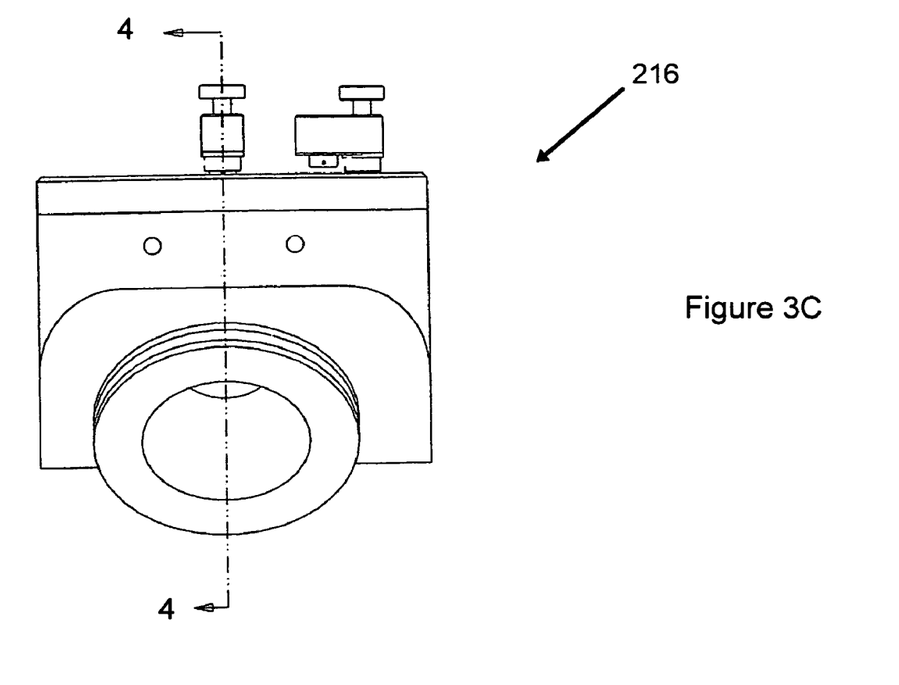

FIGS. 3A-3C are alternative plan views of the optical assembly 216 of FIGS. 2A and 2B.

Figure 4:
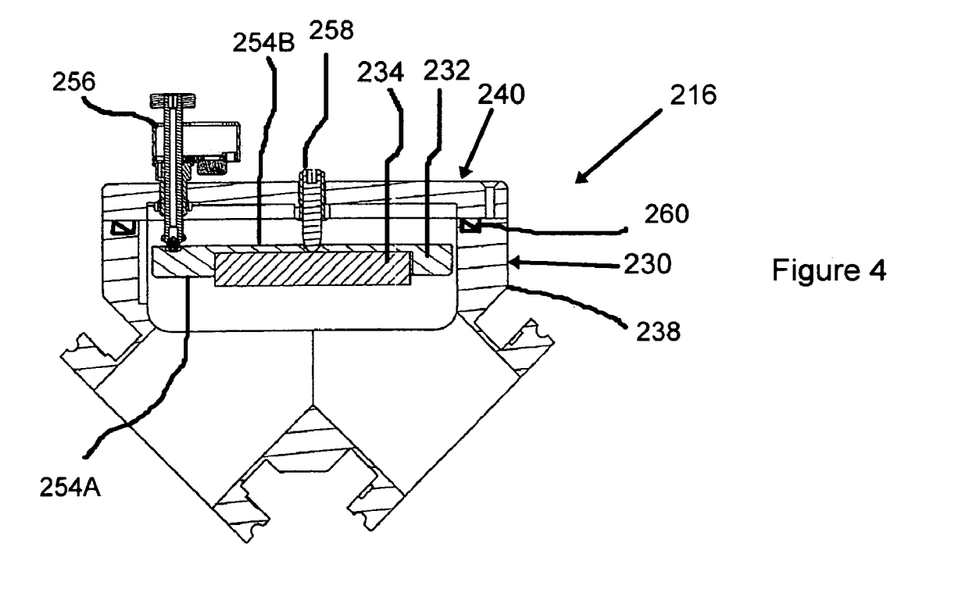
FIG. 4 is a cut-away view taken on line 4-4 of FIG. 3C.

FIG. 4 is a cut-away view of the optical assembly 216 taken on line 4-4 of FIG. 3C. As discussed above, the distal end of the movers 256, 258 engage the rear side 254B of the element plate 232. By engaging the rear side 254B of the element plate 232, the optical assembly 16 can be effectively smaller for a given size optical element 234 than if the movers 256, 258 engage the front side 254A of the optical element 234.

In FIG. 4, the manual mover 258, e.g. a set screw, can be rotated manually relative to the removable section 240 to move the element plate 232 and the optical element 234. Further, the electronic movers 256 (only one shown in FIG. 4) moves the distal end to move the element plate 232 and the optical element 234.

In one embodiment, the optical assembly 216 includes a housing seal assembly 260 that seals the removable section 240 to the body section 238. With this design, the optical assembly 216 can be used as a sealed optical assembly 216 with the beam in a controlled environment. For example, the housing seal assembly 260 can include an "O" ring type seal that is positioned between the removable section 240 to the body section 238. Additionally, the threads that extend through removable section 240 can be greased screw threads that act as seals for the element adjuster 236. However, other designs for the housing seal assembly 260 can be utilized.

Moreover, with reference with FIG. 4, the removable section 240 is removed relatively easily from the body section 238. Further, in certain embodiments, the optical element 234, the element plate 232, and the element adjuster 236 are removed simultaneously with the removable section 240.

Figure 5A:
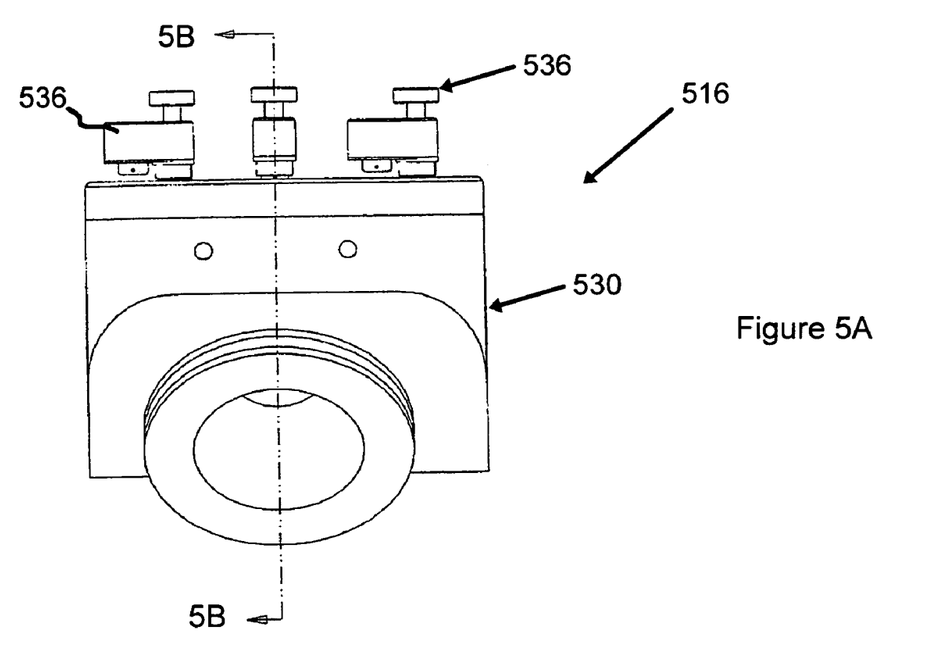
FIG. 5A is a plan view of another embodiment of an optical assembly having features of the present invention.
Figure 5B:
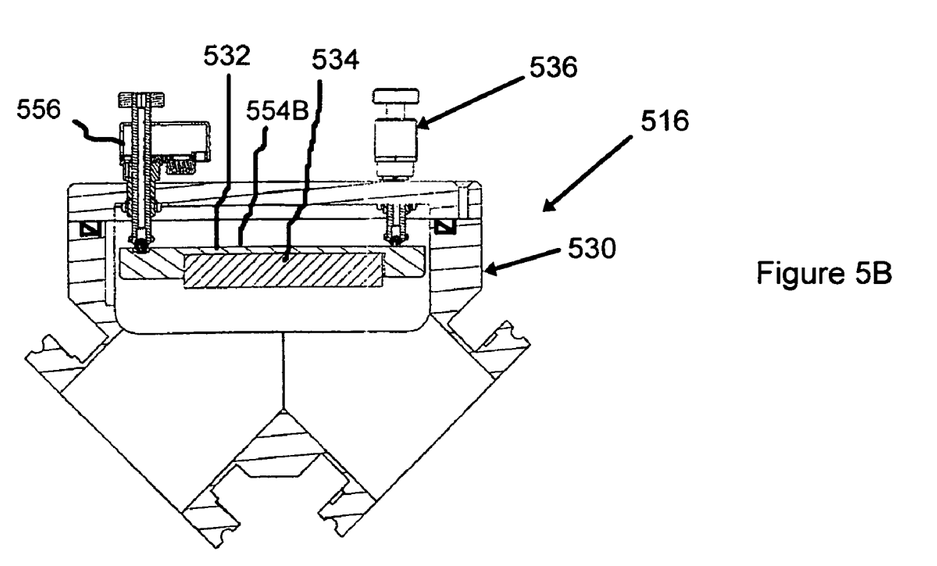
FIG. 5B is a cut-away view taken on line 5B-5B of FIG. 5A.

FIG. 5A is a plan view and FIG. 5B is a cut-away view of another embodiment of an optical assembly 516 having features of the present invention that can be used in the precision apparatus 10 of FIG. 1 or another type of precision apparatus. In this embodiment, the housing 530, the element plate 532, and the optical element 534 are somewhat similar to the corresponding components described above. However, in this embodiment, the element adjuster 536 is slightly different.

More specifically, in this embodiment, the element adjuster 536 includes three spaced apart electronic movers 556 that engage the rear side 554B of the element plate 532 and that move and position the element plate 532 and the optical element 534. With this design, the element adjuster 536 can move the optical element 534 and the element plate 532 with three degrees of movement, namely translation along the X axis and rotation about the Y and Z axes.

Figure 6A:
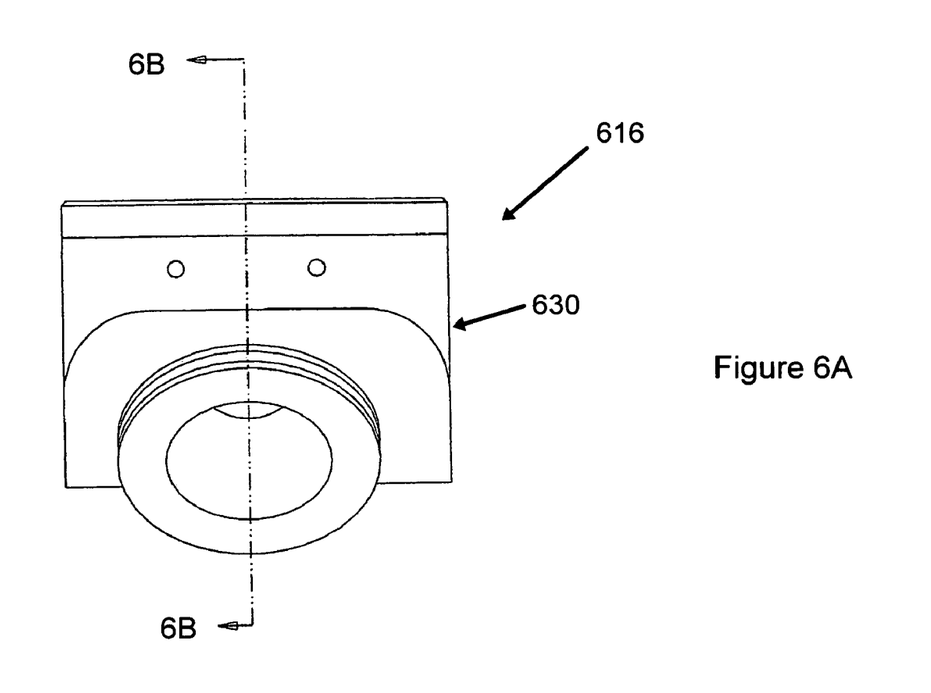
FIG. 6A is a plan view of yet another embodiment of an optical assembly having features of the present invention.
Figure 6B:
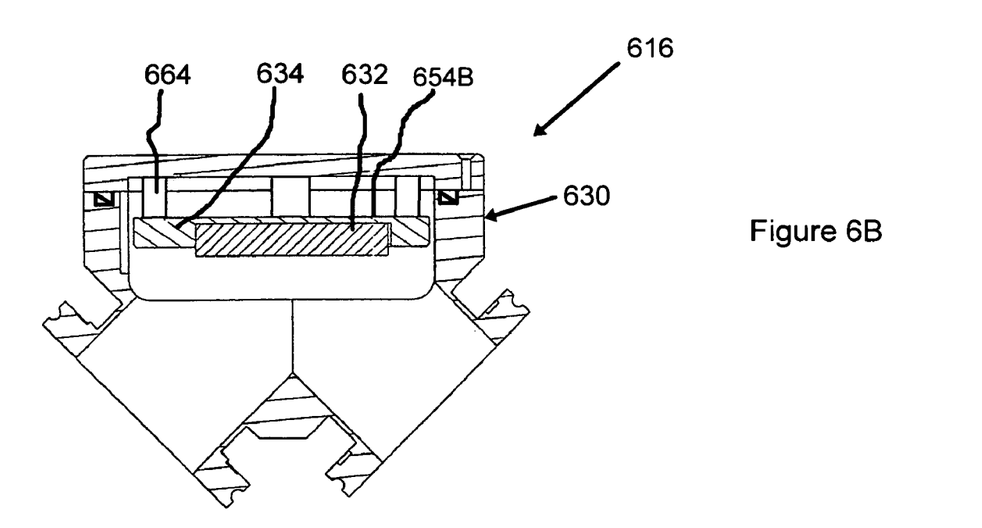
FIG. 6B is a cut-away view taken on line 6B-6B of FIG. 6A.

FIG. 6A is a plan view and FIG. 6B is a cut-away view of another embodiment of an optical assembly 616 having features of the present invention that can be used in the precision apparatus 10 of FIG. 1 or another type of precision apparatus.

In this embodiment, the housing 630, the element plate 632, and the optical element 634 are somewhat similar to the corresponding components described above. However, in this embodiment, the optical assembly 616 does not include an element adjuster.

More specifically, in this embodiment, the optical assembly 616 includes one or more mounts 664 that rigidly couple the rear side 654B of the element plate 532 to the removable section 640.

Figure 7A:
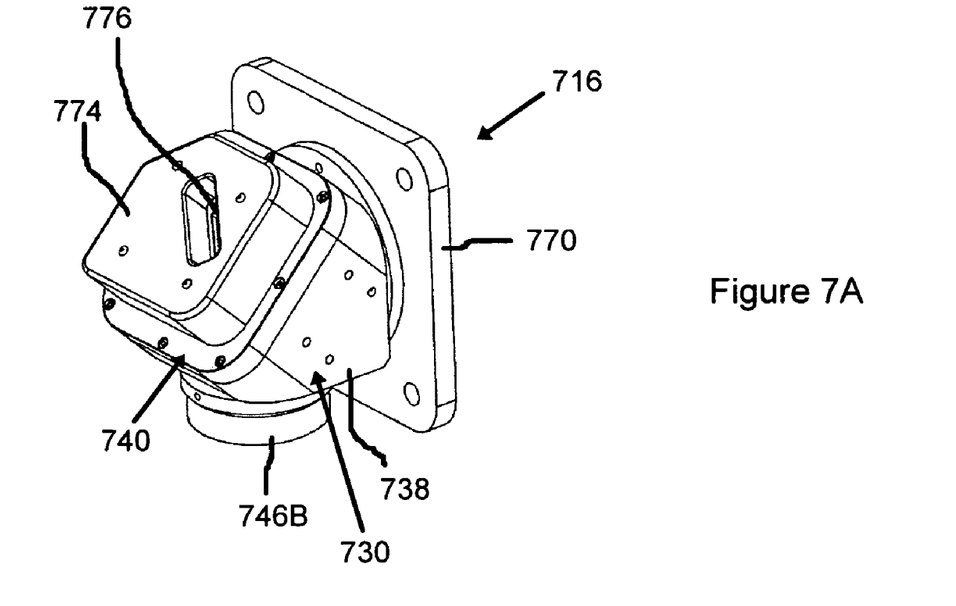
FIG. 7A is a perspective view of another embodiment of an optical assembly having features of the present invention.
Figure 7B:
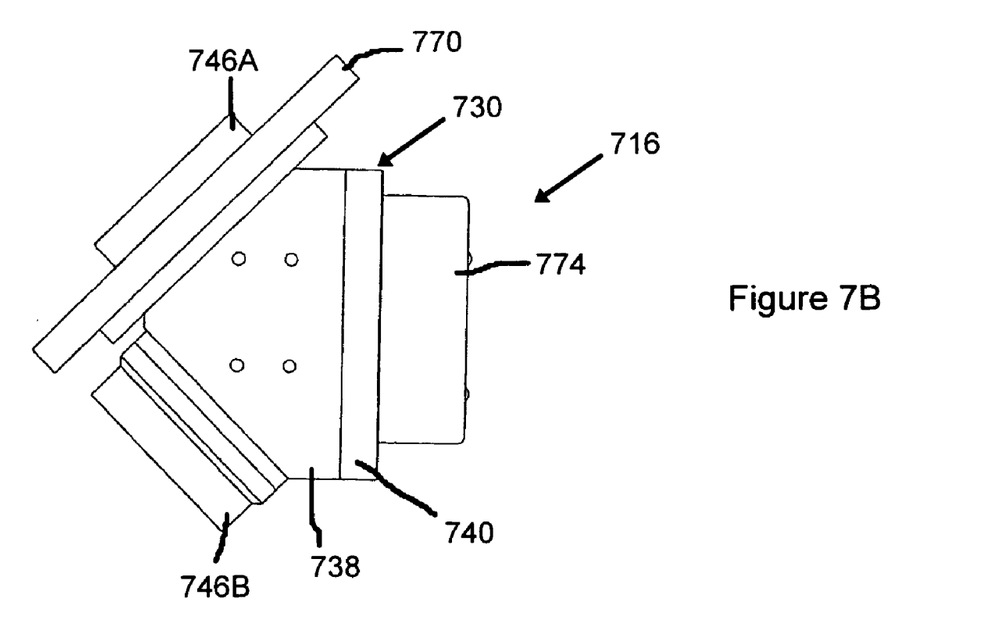
FIGS. 7B and 7C are alternative plan views of the optical assembly of FIG. 7A.
Figure 7C:
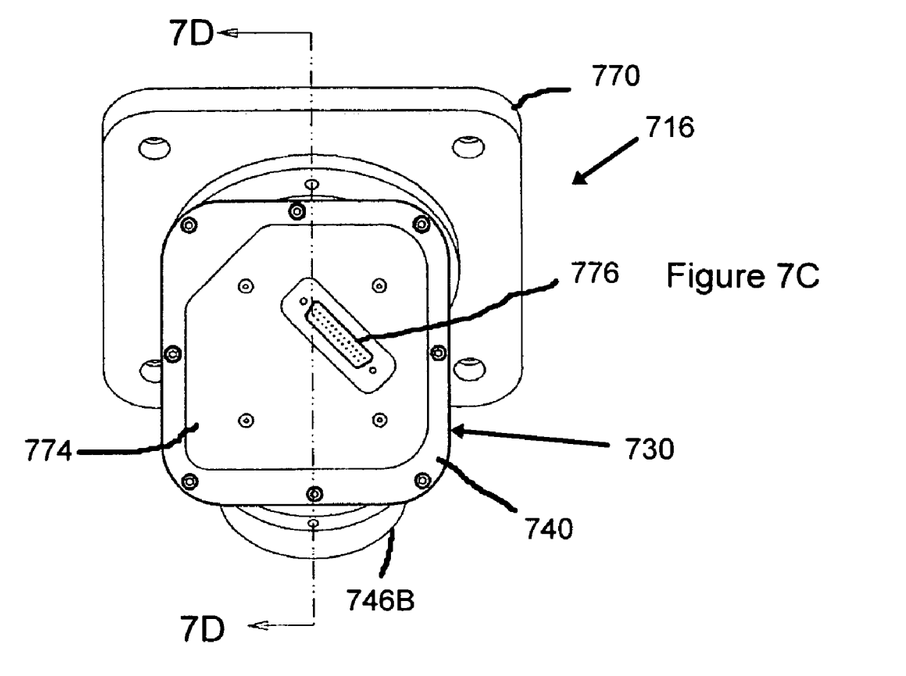
Figure 7D:
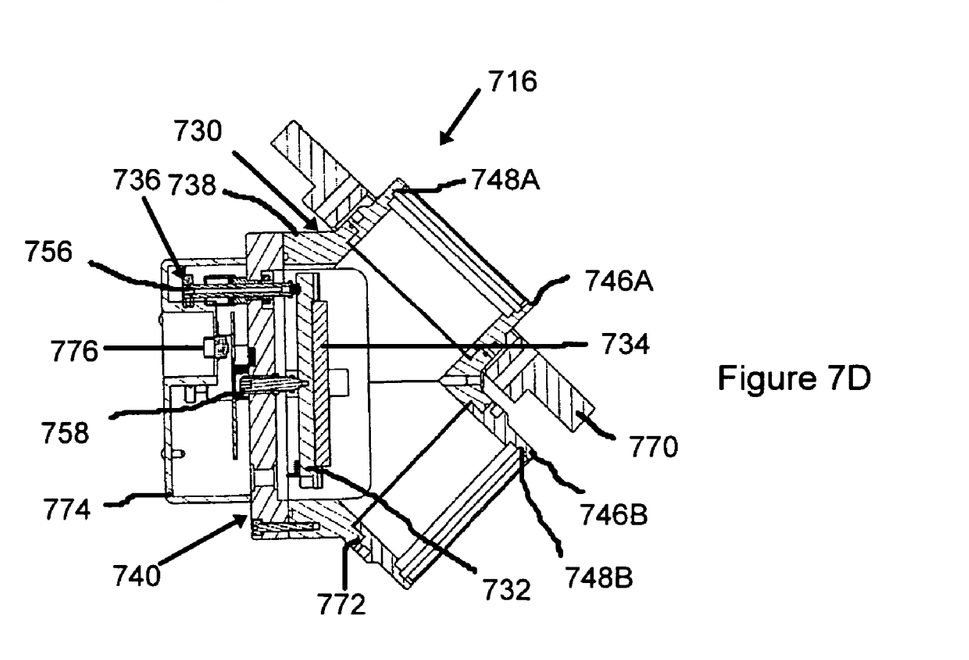
FIG. 7D is a cut-away view taken on line 7D-7D of FIG. 7C.

FIG. 7A is a perspective view, FIGS. 7B and 7C are alternative plan views, and FIG. 7D is a cut-away view of another embodiment of an optical assembly 716 having features of the present invention that can be used in the precision apparatus 10 of FIG. 1 or another type of precision apparatus. In this embodiment, the housing 730, the element plate 732, the optical element 734, and the element adjuster 736 have somewhat similar features to the corresponding components described above.

However, in this embodiment, the mounting flanges 746A, 746B of the housing 730 include an inner diameter seal retainer 748A, 748B and the first mounting flange 746A includes a generally rectangular shaped additional first mount 770 that fits over the first mounting flange 746A. Further, in this embodiment, the mounting flanges 746A, 746B are removable attached to the rest of the body section 738 and a separate flange seal 772 that seals the intersection between each of the mounting flanges 746A, 746B and the rest of the body section 738. With this design, the mounting flanges 746A, 746B can be easily changed to suit other apparatus 10 designs.

Further, in this embodiment, the optical element 734 is generally rectangular shaped. Moreover, in this embodiment, the element adjuster 736 includes an adjuster housing 774 that is secured to the removable section 740 and that encloses the electronic movers 756 and the manual mover 758. Additionally, the element adjuster 736 includes an electrical connector 776 that electrically connects to the electronic movers 756.

While the particular apparatus 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An optical assembly for a precision apparatus that includes an apparatus frame, the optical assembly comprising:
   an optical element;
   a housing including a body section that is secured to the apparatus frame, a removable section that couples the optical element to the body section with the optical element positioned within the housing, and a fastener assembly that selective secures the removable section to the body section; and
   an element plate that retains the optical element, the element plate including a rear side that is coupled to the removable section.

2. The optical assembly of claim 1 wherein the housing includes a housing seal assembly that seals the removable section to the body section.

3. The optical assembly of claim 1 wherein the optical element is coupled to the removable section in a kinematic fashion.

4. An optical assembly for a precision apparatus that includes an apparatus frame, the optical assembly comprising: an optical element; a housing including a body section that is secured to the apparatus frame, a removable section that couples the optical element to the body section with the optical element positioned within the housing, and a fastener assembly that selective secures the removable section to the body section; and an element adjuster that adjusts the position of the optical element relative to the removable section.

5. The optical assembly of claim 4 wherein the element adjuster includes at least one electronic mover.

6. The optical assembly of claim 4 wherein the element adjuster moves the optical element with at least two degrees of freedom.

7. The optical assembly of claim 4 further comprising an element plate that retains the optical element and wherein the element adjuster engages the element plate in a kinematic fashion.

8. The optical assembly of claim 1 wherein the optical element is a reflective element.

9. A precision apparatus comprising a beam source that generates a beam, an object, and the optical assembly of claim 1 directing the beam at the object.

10. A precision apparatus comprising: an apparatus frame, a beam source that generates a beam, an object, and an optical assembly for directing the beam at the object, the optical assembly comprising: an optical element; a housing including a body section that is secured to the apparatus frame, a removable section that couples the optical element to the body section with the optical element positioned within the housing, and a fastener assembly that selective secures the removable section to the body section; wherein the precision apparatus further comprises an environmental controller that provides a controlled environment within the housing chamber.

11. An optical assembly for a precision apparatus that includes an apparatus frame, the optical assembly comprising:
   a housing including a body section that is secured to the apparatus frame, a removable section, and a fastener assembly that selective secures the removable section to the body section;
   an optical element positioned within the housing, the optical element being coupled to the housing in a kinematic; and
   an element plate that retains the optical element, the element plate including a rear side that is coupled to the removable section.

12. The optical assembly of claim 11 wherein the housing includes a housing seal assembly that seals the removable section to the body section.

13. An optical assembly for a precision apparatus that includes an apparatus frame, the optical assembly comprising: a housing including a body section that is secured to the apparatus frame, a removable section, and a fastener assembly that selective secures the removable section to the body section; an optical element positioned within the housing, the optical element being coupled to the housing in a kinematic fashion; and an element adjuster that adjusts the position of the optical element relative to the removable section.

14. The optical assembly of claim 13 wherein the element adjuster includes at least one electronic mover.

15. The optical assembly of claim 13 further comprising an element plate that retains the optical element and wherein the element adjuster engages the element plate in a kinematic fashion.

16. The optical assembly of claim 11 wherein the optical element is a reflective element.

17. A precision apparatus comprising a beam source that generates a beam, an object, and the optical assembly of claim 11 directing the beam at the object.

18. A precision apparatus comprising: an apparatus frame, a beam source that generates a beam, an object, and an optical assembly directing the beam at the object, the optical assembly comprising: a housing including a body section that is secured to the apparatus frame, a removable section, and a fastener assembly that selective secures the removable section to the body section; and an optical element positioned within the housing, the optical element being coupled to the housing in a kinematic fashion; wherein the precision apparatus further comprises an environmental controller that provides a controlled environment within the housing.

19. A method for redirecting a beam on a beam path in a precision apparatus, the method comprising the steps of:
   securing a body section of a housing to an apparatus frame;
   selectively securing a removable section of the housing to the body section of the housing;
   coupling a refractive element to the removable section of the housing so that the reflective element is positioned in the beam path when the removable section is secured to the body section; and
   providing an element plate that retains the optical element, and the step of coupling includes the step of coupling a rear side of the element plate to the removable section.

20. The method of claim 19 further comprising the step of sealing the removable section to the body section.

21. A method for redirecting a beam on a beam path in a precision apparatus, the method comprising the steps of:
   securing a body section of a housing to an apparatus frame;
   selectively securing a removable section of the housing to the body section of the housing; coupling a refractive element to the removable section of the housing so that the reflective element is positioned in the beam path when the removable section is secured to the body section; and adjusting the position of the optical element relative to the removable section with an element adjuster.

22. The optical assembly of claim 1 wherein the removable section is generally flat plate shaped.

23. The optical assembly of claim 4 wherein the optical element includes an optic center, and wherein the element adjuster includes a mover positioned behind the optic center of the optical element.

24. The precision apparatus of claim 10 further comprising a first tube, and a second tube; wherein the body section of the optical assembly is connects the first tube and the second tube together, and wherein the removable section and the optical element can be removed from the body section without disconnecting the body section from the tubes.

* * * * *

UNITED STATES PATENT AND TRADEMARK OFFICE
CERTIFICATE OF CORRECTION

PATENT NO. : 7,508,602 B2 Page 1 of 1
APPLICATION NO. : 11/585548
DATED : March 24, 2009
INVENTOR(S) : David F. Arnone et al.

It is certified that error appears in the above-identified patent and that said Letters Patent is hereby corrected as shown below:

Column 8, line 42, after the word "kinematic" please insert the following:

-- fashion --

Signed and Sealed this

Fifth Day of May, 2009

JOHN DOLL
*Acting Director of the United States Patent and Trademark Office*